United States Patent [19]

Hauptmann

[11] Patent Number: 4,528,565
[45] Date of Patent: Jul. 9, 1985

[54] PULSE DOPPLER RADAR RECEIVER WITH A CIRCUIT FOR REDUCING SPURIOUS SIGNALS

[75] Inventor: Rudolf Hauptmann, Dachau, Fed. Rep. of Germany

[73] Assignee: Siemens Aktiengesellschaft, Berlin & Munich, Fed. Rep. of Germany

[21] Appl. No.: 363,769

[22] Filed: Mar. 31, 1982

[30] Foreign Application Priority Data

Apr. 27, 1981 [DE] Fed. Rep. of Germany ....... 3116612

[51] Int. Cl.³ .............................................. G01S 7/28
[52] U.S. Cl. ................................ 343/17.1 R; 343/418; 364/577
[58] Field of Search ............ 343/7.7, 17.1 R, 17.1 PF, 343/402, 405, 418; 364/577, 723; 328/120

[56] References Cited

U.S. PATENT DOCUMENTS 3,391,403 7/1968 Phillips, Jr. ................... 343/17.1 R
4,225,931 9/1980 Schwefel ............................. 364/723

FOREIGN PATENT DOCUMENTS 1178911 5/1965 Fed. Rep. of Germany .
1239744 5/1967 Fed. Rep. of Germany .
1247420 8/1967 Fed. Rep. of Germany .
1407467 9/1975 United Kingdom .

*Primary Examiner*—Sal Cangialosi
*Assistant Examiner*—K. R. Kaiser
*Attorney, Agent, or Firm*—Hill, Van Santen, Steadman & Simpson

[57] ABSTRACT

A pulse Doppler radar receiver which continuously monitors successively obtained amplitude values Ao through An with the disrupted amplitude values which deviate by a prescribed value from an interpolation value obtained from adjacent undisturbed amplitude values are determined and are limited to a value obtained from the interpolation value or from the largest or smallest adjacent undisrupted amplitude values and are substituted for the disrupted values. The apparatus includes an interpolation circuit which includes the shift register and limiter with the memory for adjusting the output signal level of the limiter.

7 Claims, 9 Drawing Figures

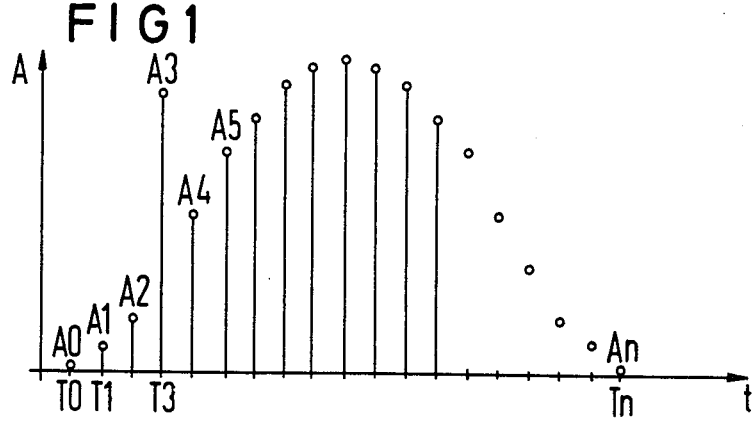
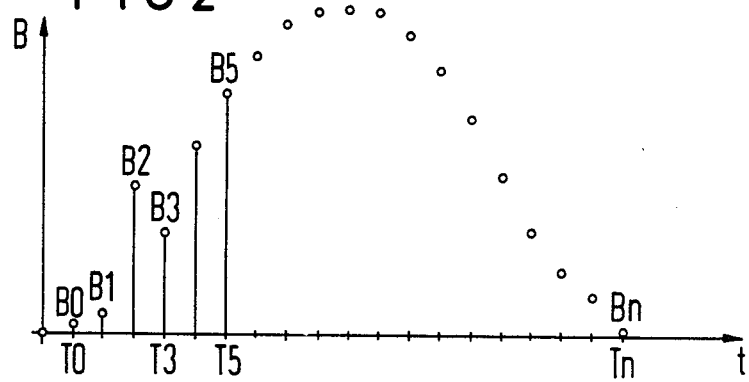
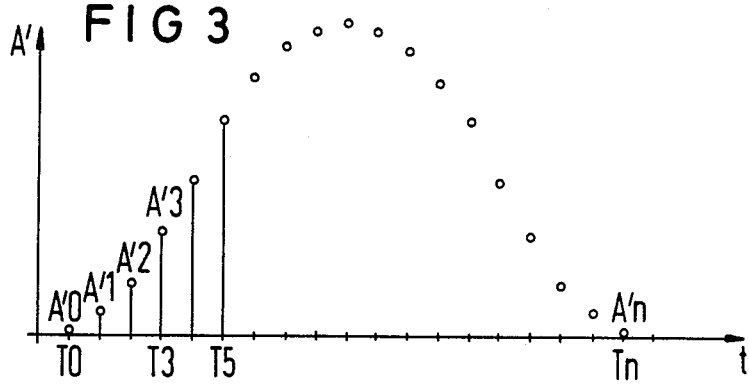

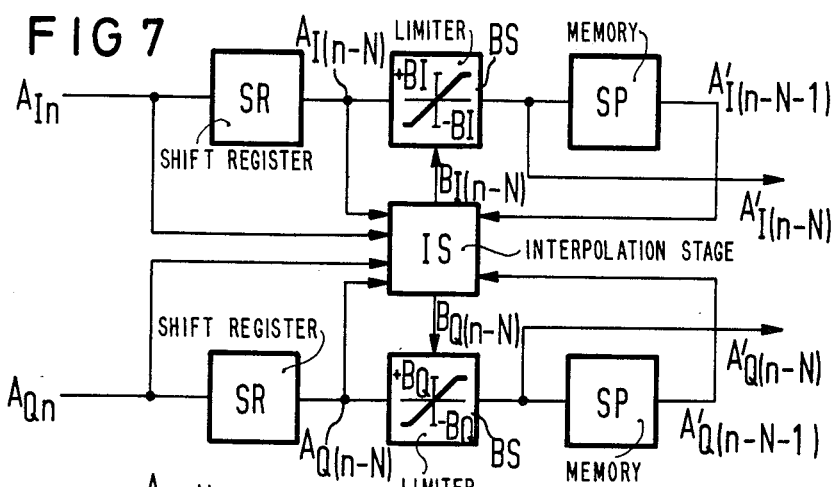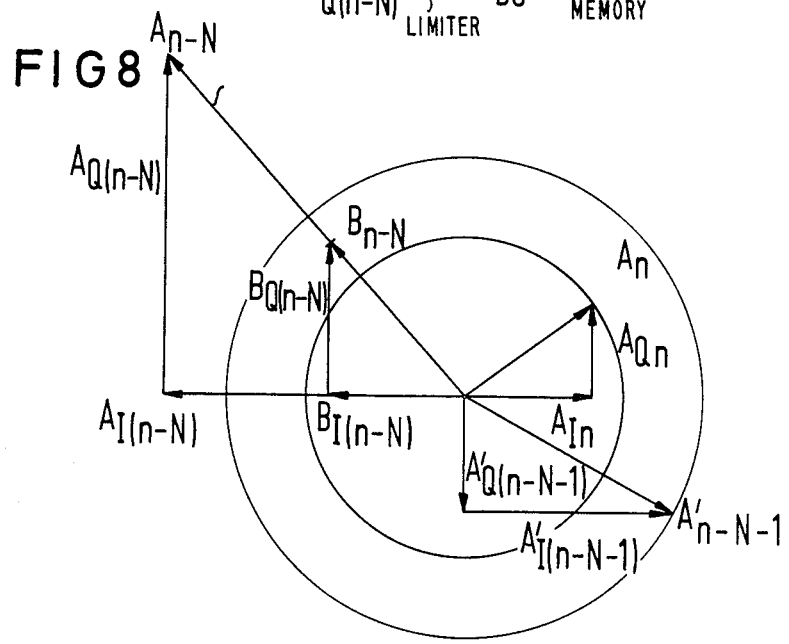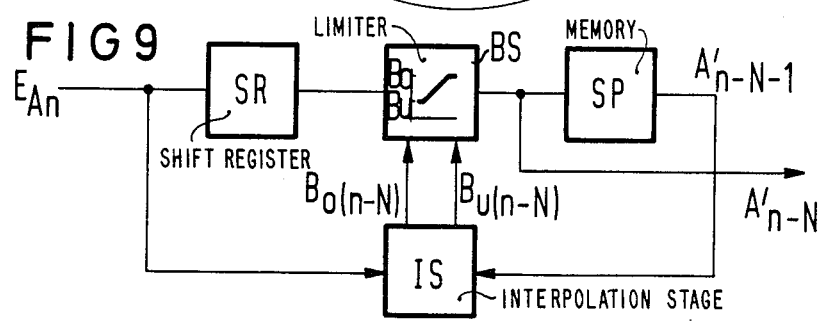

PULSE DOPPLER RADAR RECEIVER WITH A CIRCUIT FOR REDUCING SPURIOUS SIGNALS

BACKGROUND OF THE INVENTION

1. Field of the Invention

This invention relates in general to pulse Doppler radar receivers including means for a large plurality of range channels and moving target filters and rectifier arrangements for obtaining the video signals and in which the video signals are supplied to an evaluation means through a postdetection-integration circuit and a video threshold circuit.

2. Description of the Prior Art

A circuit arrangement for the suppression of interfering signals for a pulse radar receiver which are supplied and an equivalent signal so as to suppress spurious signals is disclosed in British Pat. No. 1,407,467 entitled "Improvements In Or Relating To Interference Suppression Circuits For Radar Receivers". The circuit arrangement described in this patent utilizes a delay network which is particularly designed for slowly swept or frequency modulated spurious signals which have a long duration relative to the useful signals.

SUMMARY OF THE INVENTION

It is an object of the present invention to provide a radar receiver which is capable of restoring the signal progression disrupted due to the absence of individual signal amplitudes or due to single shot pulse swamping to obtain the original form so that the detection probability of generally weak moving target echo signals can be detected. The circuit can be designed and constructed within appropriate limits. The invention provides a circuit arrangement for limiting and substituting individual, disrupted signal amplitudes which is inserted between the rectifier and the postdetection-integration circuit in conjunction with an interpolation circuit which comprises a shift register and a limiter between the input and output and has two circuit branches connected in parallel and wherein the interpolation circuit and a memory in the second circuit branch adjusts the limiting of values of the limiter.

The successively obtained amplitude values are continually observed and compared to the directly adjacent amplitude values or by means of comparison to an interpolation value from said amplitude values so that the amplitude value deviations of a prescribed value from the maximum or minimum values or from the interpolation value are determined and the disrupted amplitude values are limited to an amplitude value obtained from the maximum or minimum values or respectively substituted by a value obtained from the interpolation value and are substituted into the output signal.

Signal values which are disrupted due to asynchronous pulses are limited to an amplitude value matched to the remaining signal progression by means of a limiter circuit with a locked threshold which is controlled by the existing interpolation value or by the maximum or minimum values. Lost or blanked out signal values are replaced by means of a substitution circuit wherein the equivalent value is derived from the maximum or minimum value or respectively from the interpolation value. With the existence of a symmetrical antenna function, the interpolation occurs by means of mean value formation from two supporting values which are taken from the signal progression before and after the signal to be checked.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 comprises a plot of the amplitude of received signals versus time;

FIG. 2 comprises a plot of amplitude versus time of the limited values allocated to the received signals;

FIG. 3 is an amplitude versus time plot after correction has been applied;

FIG. 7 illustrates a further modification of the interpolation circuit of the invention;

FIG. 8 comprises a vector diagram illustrating the signal relationships for the circuit of FIG. 7; and FIG. 9 is a block diagram of the interpolation circuit which has two thresholds.

DESCRIPTION OF THE PREFERRED EMBODIMENTS

As illustrated in FIG. 1, the amplitude A of a function of time for a sequence of discrete amplitude values A0, A1 . . . An which correspond to the individual samples from the echo signal of a target after rectification at times T0, T1 . . . Tn is plotted. Such data can be samples of a pulse radar which occurs at the clock rate of the pulse radar repetition frequency for a respective distance range. Except for the unusually high amplitude value A3 which can be attributed to an asynchronous noise pulse, the envelope of the illustrated amplitude values varies as a function of time as a bell-shaped distribution. Such envelopes occur in a radar device due to the fact that the radiation pattern of the antenna is swept over a target which is either fixed or moving in the radial direction or where a target moving tangentially crosses through the fixed radiation pattern. Such an envelope can be determined for each radar receiver from the characteristics of the antenna and from the size of the targets which are to be detected by the antenna. The amplitude of a signal at time T3 which was either disrupted by a noise pulse or dropped out for some other reason can be reconstructed from the envelope.

FIG. 2 is a plot of the limiting values Bo . . . Bn corresponding to the sampling times of the received signals which are illustrated in FIG. 1 and which are obtained by means of interpolation of measured supporting values for the case of a single-shot disruption and which represent the threshold value of a circuit for limiting the noise pulses at the same time.

Figure 4:
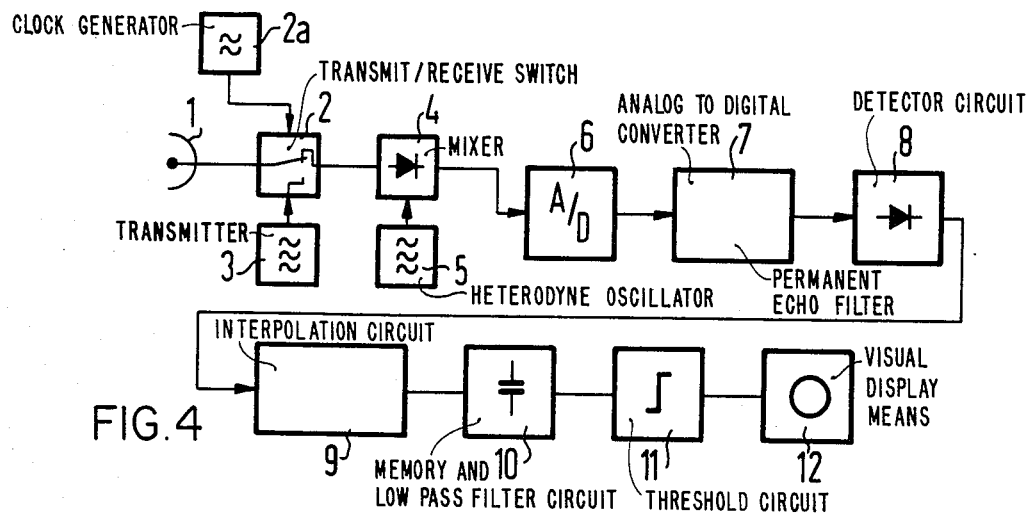
FIG. 4 is a simplified block diagram of the invention.

FIG. 4 illustrates a simplified block diagram of a pulsed radar with an interpolation circuit which has an antenna 1 which supplies an output through a transmit/receive switch 2 which is connected to a transmitter 3 and a clock generator 2a. The changeover of the transmit/receive switch 2 is controlled by the clock generator 2a. A mixer 4 receives the output of the antenna 1 and an input from a heterodyne oscillator 5. The echo signals of the individual targets are separately processed by suitable circuits whereby range channels for example can be employed. A single such branch is illustrated for a specific range in FIG. 5. The echo signals of only one target lying in a specific range pass into a specific range channel without mixing with echo signals of other targets occurring. Echo signals of asynchronous pulse jammers according to statistical distribution thus will fall in most distance ranges with only one pulse. With digital processing the output of the mixer stage 4 is passed to an analog/digital converter 6 which supplies an output to a digital working permanent echo filter 7 which in turn supplies an output to a rectifier or detector circuit 8 which adds in case of quadrature channels the amplitudes of the signals. The rectified signal of the rectifier 8 is supplied to an interpolation circuit 9 which supplies an output to a memory and low-pass filter circuit (postdetection-integration) 10. A threshold circuit 11 receives the output of the memory and low-pass filter circuit 10 and supplies an output to a visual display means 12.

Figure 5:
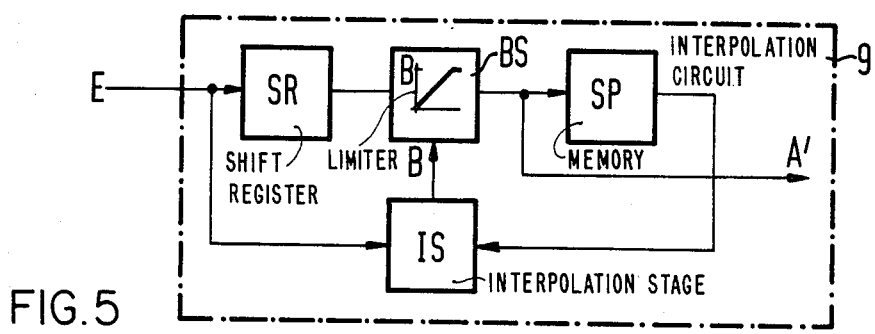
FIG. 5 is a block diagram of the interpolation circuit of the invention.

FIG. 5 illustrates in detail a simple interpolation circuit 9 which also includes a threshold limiter circuit which removes the asynchronous disruptive pulses. Such pulses can be produced for example by the ignition systems of motor vehicles or by external radar systems and are suppressed without noticeably influencing the signal passage at the output of the memory and low-pass filter circuit 10 which comprises an integrator. Because of the knowledge of the signal progression at a specific location of the radar receiver, conclusions can be drawn from measured supporting values concerning the signal progression in the environment. So as to eliminate noise signals the environment is measured and the chronological progression of the undisturbed signal is interpolated therefrom. In principle, all known interpolation methods can be applied. A preferred embodiment uses the mean value formation from two adjacent amplitude values. A maximum or, respectively, minimum value formation is also possible. Depending upon the type of the interpolation method utilized, a different number of supporting values is necessary. Since target signals are generally subject to a symmetrical antenna function as illustrated in FIG. 1, it is advantageous to measure the supporting values before and after a noise signal.

The interpolation and limiter arrangement illustrated in FIG. 5 utilizes mean value formation or linear interpolation between two signal amplitudes whereby the noise signal occurs in only one reception period (N=1). The supporting values are obtained during one respective reception period before and one period after the reception period which is to be currently checked. The signal of the observed reception period is limited to the interpolated value in this circuit and it serves as the supporting value during the next reception period. When, for example, the received signals A2, A3 are observed in succession at times T2 and T3, then the first interpolation value is obtained from the amplitude values A1 and A3 by using mean value formation. Since a high noise pulse occurs at time T3, the limiter value of B2 illustrated in FIG. 2 also has a high value which extends above the normal bell-shaped progression. Since the limiter value B2 is greater than the amplitude value A2, no operation will be performed on the signal progression. The next interpolation value for inspecting the signal amplitude at time T3 is formed from the amplitude values A2 and A4. The limiter value B3 obtained therefrom limits the high noise signal adjacent time T3 to a normal signal amplitude of A'3 which corresponds to B3 as illustrated in FIG. 3. During the next reception period, the corrected signal A'3 is utilized as a supporting value for the next interpolation together with the signal amplitude A5. Thus, when an unusually high signal is received which falls out of the normal pattern of the bell-shaped curve the signals on opposite sides of such unusual signal are utilized to form a mean value for interpolation and such value is utilized.

Signals appearing at the input E of the interpolation and limiting circuit 9 in FIG. 5 are supplied to a shift register SR which is shifted at the clock frequency of the radar repetition frequency rate. The number of N memory locations in the shift register depends on the number of possible noise pulses which can successively occur in the input E. The signal amplitudes at the output of the shift register SR are limited in amplitude by a limiter BS. The threshold value B of the limiter BS represents a locked on threshold which is constantly resupplied to the limiter BS from an interpolation stage IS. The signals from the input E of the circuit and the memory SP which is connected to the limiter stage BS are supplied to the interpolation stage IS which is designed as a stage for forming a mean value. When the output signals of the shift SR are greater than the interpolated value by a prescribed amount such value is replaced or, respectively, limited by the interpolated value in the embodiment illustrated in FIG. 5. The limited signal A' forms on the one hand the output of the circuit and on the other hand is read into the memory SP at the clock frequency of the radar repetition frequency and is delayed therein by a radar reception period. The described circuit is very effective when the number of successive occurring noise pulses are small and also when the number of memory locations in the shift register SR is small. Thus, the circuit is particularly suited for employment directly behind the analog to digital converter 6 (N=1), or behind a simplex canceller (N=2), or behind a duplex canceller where (N=3).

Figure 6:
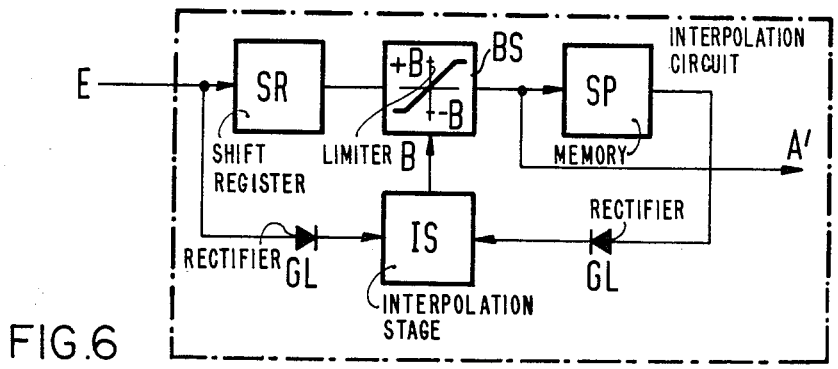
FIG. 6 illustrates a modification of the interpolation circuit of the invention.

When the circuit is utilized in front of the rectifier circuit 8, than a two-sided limiter having thresholds of +B and −B must be utilized. This is illustrated in FIG. 6 and furthermore a pair of rectifiers GL must be connected in the inputs of the interpolation stage IS as illustrated in FIG. 6.

In each instance, the interpolation stage can also be designed so that the limiter value B is obtained from the larger amplitude of the signal E or the output signal of the memory SP (maximum value formation).

When the circuit is employed in a complex functioning system with I channel and Q channel (inphase signal and quadrature signal), then it can be useful to also calculate a complex limiter value $B_I$ and $B_Q$ and such arrangements are illustrated in FIGS. 7 and 8.

When the input signals $A_0$ through $A_n$ are divided into real and imaginary components $A_n = A_{In} + jA_{Qn}$, then the limiter values can be calculated for example as illustrated below although any other algorithm could be utilized.

$$B_{I(n-N)} = \tfrac{1}{2} ( \sqrt{A'^2_{I(n-N-1)} + A^2_{Q(n-N-1)}} + \sqrt{A^2_{In} + A^2_{Qn}} ) \cdot$$

$$A_{I(n-N)} / \sqrt{A^2_{I(n-N)} + A^2_{Q(n-N)}}$$

-continued $$B_{Q(n-N)} = \frac{1}{2} ( \sqrt{A'^2_{I(n-N-1)} + A'^2_{Q(n-N-1)}} + \sqrt{A^2_{In} + A^2_{Qn}} ) \cdot$$

$$A_{Q(n-N)} / \sqrt{A'^2_{I(n-N)} + A'^2_{Q(n-N)}}$$

In the sample embodiments described so far, it has been chiefly the larger noise pulses which were detected and replaced by interpolation.

It is also possible to replace signals which are too small that is, which are smaller than the adjacent supporting values by a prescribed amount. This allows gaps in the signal progression to be corrected.

In FIG. 7 a pair of shift registers SR respectively receive the inputs $A_{In}$ and $A_{Qn}$ which signals are also supplied to the interpolation stage IS. The output of the shift registers SR and SR are respectively supplied to the interpolation stage IS as well as to limiter circuits BS which are in the respective channels. Memories SP and SP receive the outputs of the two limiters BS respectively and supply inputs to the interpolation stage IS, and the two outputs are supplied from the limiter circuits BS and BS.

FIG. 8 comprises a phase diagram illustrating the relative phase of the signals in the circuit of FIG. 7.

It is also possible to replace signals which are too small that is smaller than the adjacent supporting values by a prescribed value so as to correct gaps in the signal progression.

FIG. 9 is an illustration of a circuit for detecting and correcting for signals which are too large as well as too small. For the purpose of simplification, a circuit is illustrated which can be utilized behind a rectifier or respectively, a amplitude adder (compare FIG. 6).

The amplitude values $A_n$ appearing at the input E of the circuit are delayed by a shift register SR by N time intervals T where N corresponds to the number of successively appearing noise pulses at the input E. The signal $A_{n-N}$ is delayed and supplied to the limiter circuit BS. When the signal $A_{n-N}$ is greater than the upper limiter threshold $B_{o(n-N)}$, or smaller than a lower limiter threshold value $B_{u(n-N)}$, it is replaced by the interpolation value $\frac{1}{2}(A_n + A_{n-N-1}')$ and when not, smaller or greater than the limiter thresholds it is supplied at the output and also to the memory SP unlimited as the signal $A_{n-N}'$. The output signal of the memory SP ($A_{n-N-1}'$) and the input signal ($A_n$) are supplied to the interpolation stage IS. On one hand, the interpolation value as, for example $\frac{1}{2}(A_n + A_{n-N-1}')$ is formed in the interpolation stage IS and, on the other hand, the upper limit value ($B_{o(n-N)} = x \cdot \frac{1}{2}(A_n + A_{n-N-1}')$) and the lower limiter value ($B_{u(n-N)} = y \cdot \frac{1}{2}(A_n + A_{n-N-1}')$) are calculated. The factors x and y indicate the tolerances for the response limits and for example x=1.5 and y=0.5.

In the above example, each value $A_{n-N}$ to be investigated is replaced by the mean value of its adjacent supporting values $A_n$ and $A_{n-N-1}'$ when it is greater than this mean value by a factor of 1.5 or when it is smaller than the mean value by a factor of 0.5. The value $A_{n-N}'$ investigated in such manner and if required corrected then again serves during the next reception period after a time interval T for the mean value formation from the values $A_{n+1}$ and $A_{n-N}'$ for investigating the value of $A_{n-N+1}$.

It is seen that this invention allows correction by use of interpolation of radar signals which fall above or below the known expected amplitude values.

Although the invention has been described with respect to preferred embodiments, it is not to be so limited as changes and modifications can be made which are within the full intended scope of the invention as defined by the appended claims.

I claim as my invention:

1. A pulse Doppler radar receiver for receiving radar video signals with apparatus for a large number of range channels and moving target filters and comprising, rectifier arrangements for detecting the radar video signals and in which said radar video signals are supplied to an evaluation means through a postdetection-integration circuit (10) and a video threshold circuit (11) including an interpolation circuit (9) for limiting and substituting individual, generated corrected amplitude signals for disrupted signals which are in error due to their amplitude variations and which includes an interpolation stage (IS), said interpolation stage being connected between said rectifier (8) and said postdetection-integration circuit (10), and said interpolation circuit (9) including a shift register (SR) and a limiter (BS) between its input and its output in a first of two circuit branches which are connected in parallel and including an interpolation stage (IS) and a memory (SP) in a second of said two circuit branches; and said limiter (BS) is controlled with an output from said interpolation stage (IS) which varies as a function of the inputs to said interpolation circuit so as to prevent extreme variations of video signals.

2. A pulse Doppler radar receiver according to claim 1, characterized in that the largest amplitude value determined by comparing the amplitude of signals adjacent to the disrupted signal is employed as the generated corrected amplitude signal.

3. A pulse Doppler radar receiver according to claim 1, characterized in that the smallest amplitude value determined by comparing the amplitude of signals adjacent to the disrupted signal is employed as the generated corrected amplitude signal.

4. A pulse Doppler radar receiver according to claim 1 characterized in that said interpolation circuit (9) is mounted in the signal path after an analog-to-digital converter (6) for digital signal processing.

5. A pulse Doppler radar receiver according to claim 1 characterized in that said interpolation circuit (9) is mounted in the signal path after a permanent echo filter (7) which may be a simplex canceller, or duplex canceller.

6. A pulse Doppler radar receiver according to claim 1 characterized in that said interpolation circuit (9) is mounted in the in-phase signal channel and quadrature signal channel of a system with a quadrature rectifier.

7. A pulse Doppler radar having an output terminal with a moveable antenna, detecting means for detecting a bell-shaped series of pulses from a target, means for detecting when one of said pulses falls outside a normally expected amplitude range, means for producing a substitute pulse for said pulse which falls outside the expected range and said means for producing a substitute pulse furnishing said pulse which falls outside said expected range to said output terminal and wherein said means for producing a substitute pulse produces by interpolation said substitute pulse with an amplitude that is between the amplitudes of pulses immediately before and immediately after said pulse which falls outside the expected range.

* * * * *